UNITED STATES PATENT OFFICE.

WILLIAM PAINTER, OF BALTIMORE, MARYLAND, ASSIGNOR TO THE CROWN CORK AND SEAL COMPANY, OF SAME PLACE.

GLUTEN COMPOUND.

SPECIFICATION forming part of Letters Patent No. 619,336, dated February 14, 1899.

Application filed January 14, 1898. Serial No. 666,662. (Specimens.)

*To all whom it may concern:*

Be it known that I, WILLIAM PAINTER, a citizen of the United States, residing at Baltimore, Maryland, have invented certain new and useful Improvements in Gluten Compounds, of which the following is a specification.

It is the object of my invention to produce a waterproofing compound particularly adapted to be used as a coating for fabrics in order to render the same practically waterproof.

My invention consists in a composition of matter including gluten and glycerin, the two ingredients being intimately stirred, as found necessary, to effect a complete solution of the gluten in the glycerin and their subsequent subjection to artificial heat.

In the production of gluten from wheat or other cereals the following properties of this substance are well known: First, as extracted in the wet state from substances containing it it is very tenacious and adhesive and is in that state practically insoluble in water, and, second, in its wet plastic state it quickly ferments, loses its tenacious and adhesive qualities, and becomes partially soluble and valueless for any purpose requiring insolubility in water. If, however, it be subjected to a process of desiccation either at atmospheric or higher temperatures before fermentation begins, it loses all tendency to ferment, and if carried to absolute dryness becomes hardened into a translucent substance resembling horn and becomes incapable of being again brought to a plastic state by immersion in water. Its insolubility and the tenacious and adhesive qualities which it possesses in the plastic state render it a desirable substance for many uses in the arts, providing these qualities can be maintained in a product containing it.

I have found that not only does mere desiccation at ordinary temperatures up to a certain condition of dryness produce in it such a change as precludes, when brought into contact with water, its return to the plastic condition which it assumes as extracted from substances containing it, but that subjecting it to temperatures of from 200° Fahrenheit upward has the effect to indurate it and render it less permeable to watery liquids in proportion as the temperature employed is high, up to that at which carbonization or decomposition begins, and somewhat in proportion to the period for which a given temperature is maintained.

I have also found that in the drying of the gluten from the original wet state by manipulating it under temperatures of about 200° Fahrenheit before dissolving it in the glycerin, measurably the same indurating effect upon the gluten is produced as when subjected to heat after application of the solution to fabrics, and for some purposes this method is employed.

I have found also that by combining gluten in the plastic state with glycerin and then subjecting it to the above-described desiccating or indurating processes I can first dispel the water which it contained in the wet plastic state and then more or less indurate it and render it less permeable to water, while retaining sufficient of the glycerin permanently combined therewith to impart to it such pliability or flexibility as may be essential to fabrics to which it may be applied or to compounds containing it.

In carrying out my invention in one application thereof I obtain the gluten in the wet plastic state which it assumes in extracting it from the cereal substance containing it and dissolve it in glycerin either before or after partial desiccation in the proportion of about one part of gluten to one and a half parts of glycerin, by weight. These proportions give the solution a viscous consistency, in which condition it is applied to various fabrics as a coating or made to permeate the interstices in certain kinds of fabric. The fabrics are then subjected to a temperature of about 250° Fahrenheit unless the gluten has been subjected to higher than atmospheric temperatures before solution, either of which treatments first dispels all the water contained in the gluten or in the compound and indurates and effects that change in the gluten which intensifies its subsequent repellent action upon water. The latter process, if continued at a sufficiently high temperature and for a sufficient time, would ultimately expel all the glycerin also, leaving the gluten friable and unsuited to fabrics which require to be flexible. I therefore arrest that process at a point which leaves sufficient of the glycerin in permanent combination with the gluten to give to the fabrics the pliability or flexibility required, and the retention of sufficient glycerin for this purpose does not detract from its waterproof quality.

I am aware that prior to my invention the adhesive nature of gluten has been known, and it has been proposed for this reason as a substitute for gelatin, animal glue, and other similar substances; but so far as I am aware it has never been used in connection with glycerin so as to form by being dissolved therein a mixture adapted to be applied to fabrics in a fluid or semifluid condition to render the same waterproof without requiring an additional coating of an astringent mixture, as heretofore has been found necessary where the use of the gluten has been proposed as simply the equivalent of other adhesive substances.

What I claim is—

1. A composition of matter consisting of gluten in solution in glycerin.

2. The method herein described consisting in dissolving gluten in a plastic state in glycerin, applying the solution to fabrics and finally subjecting said fabrics to artificial heat, substantially as described.

In testimony whereof I affix my signature in presence of two witnesses.

WILLIAM PAINTER.

Witnesses:
 JOHN T. HAWKINS,
 W. H. WHEELER.